United States Patent Office 3,409,724
Patented Nov. 5, 1968

3,409,724
METHOD OF CONTROLLING MILDEW WITH NAPHTHYL PHENYLSULFIDES
Philip S. Magee, San Rafael, Calif., assignor to Chevron Research Company, San Francisco, Calif., a corporation of Delaware
No Drawing. Filed May 19, 1966, Ser. No. 551,229
6 Claims. (Cl. 424—337)

ABSTRACT OF THE DISCLOSURE

A method for controlling mildew disease comprising applying compounds of the formula

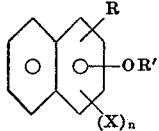

wherein R is a p-halophenylthio group in which the halogen is of atomic number 17 to 35, R' is hydrogen or aliphatic hydrocarbyl having 1 to about 6 carbon atoms, $n$ is an integer from 0 to 2 and X is an electronegative radical. The group OR' is in the 1 or 2 position of the naphthalene nucleus. R is in the 1 position when OR' is in the 2 position and in the 4 position when OR' is in the 1 position.

---

This invention relates to unique aromatic sulfides and their use of mildewcides. More particularly, it concerns halophenyl naphthyl sulfides and their use as mildewcides.

These aromatic sulfides may be represented by the following general formula:

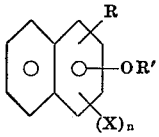

wherein R is a p-halophenylthio group in which the halogen is of atomic number 17 to 35, R' is hydrogen or aliphatic hydrocarbyl having 1 to about 6 carbon atoms, $n$ is an integer from 0 to 2 and X is an electronegative radical. The group OR' is in the 1 or 2 position of the naphthalene nucleus. R is in the 1 position when OR' is in the 2 position and in the 4 position when OR' is in the 1 position. Preferably, R is a p-chlorophenylthio group in the 1 position, R' is lower alkyl (1 to 4 carbon atoms) and $n$ is 0.

Examples of aliphatic hydrocarbyl groups which R' may be are methyl, ethyl, i-propyl, n-butyl, amyl, hexyl, propenyl, 2-butenyl, propynyl and butynyl.

Examples of electronegative radicals which X may represent are nitro, halogen, carboxyl, hydroxyl, sulfo, cyano, nitroso and the like.

Specific compounds which are included in the above formula are illustrated by 2-ethoxy-1-naphthyl p-chlorophenyl sulfide, 2-i-propoxy-1-naphthyl p-bromophenyl sulfide, 1-butoxy-4-naphthyl p-chlorophenyl sulfide, 2-hydroxy-1-naphthyl p-bromophenyl sulfide, 1-alloxy-4-napthyl p-chlorophenyl sulfide, 4-nitro-2-butenoxy-1-naphthyl p-chlorophenyl sulfide, 2,3-dihydroxy-1-naphthyl p-bromophenyl sulfide, 2-hexoxy-1-naphthyl p-chlorophenyl sulfide and 2-(2-pentenoxy)-1-naphthyl p-chlorophenyl sulfide.

In general these new aromatic sulfides may be made by reacting a 1- or 2-hydroxy- or hydrocarboxynaphthalene with a p-halophenylsulfenyl halide, preferably a sulfenyl chloride. This reaction is exothermic. It is desirably done in the presence of solvents such as chloroform, methylene chloride, benzene or mutual solvents which are not reactive to the sulfenyl halide or naphthalene compound. Desirably it is done at about ambient temperature to 75° C. The reaction pressure is not critical—atmospheric or autogenous pressure is therefore desirable. The reactant proportions are not critical in this reaction. Under normal conditions stoichiometric proportions or excess p-halophenylsulfenyl halide will be used.

If desired, an alternative method may be used to make the hydrocarboxynaphthyl p-halophenyl sulfides. It involves first preparing a hydroxylnaphthylhalophenyl sulfide as described above and reacting its alkali metal salt, preferably its sodium salt, with a suitable hydrocarbyl halide, e.g., methyliodide, methylbromide, ethylchloride, propargylbromide and the like.

The electronegative substituents on the naphthalene nucleus (X in the above formula) may be introduced by halogenation, nitration, acylation and the like. These reactions are well known and do not require further exemplification or explanation.

These novel aromatic sulfides may be used in toxic amounts to kill or control various mildews. For use as mildewcides they will desirably me formulated singly or combined in toxic amounts with biologically inert carriers. Solid carriers comprising clays such as attapulgite, kaolin, sepiolite, montmorillonite, bentonite and the like are preferred. These solid formulations may be in the form of dusts, granules or wettable powders, preferably the latter. These wettable powders will normally contain 15-80 wt. percent active ingredient, more usually 50-80 wt. percent. They will also contain a surface active agent. Aromatic solvents may be used to make liquid formulations of these sulfides.

Mildewcide compositions of these sulfides may also contain other pesticides, dispersing agents, fillers and the like.

Mildewcidally-effective amounts of these formulations may be applied to any environmental area which hosts or is subject to attack from mildew. They may be sprayed or otherwise applied directly to plants, plant seeds, soil or other hosts. Phytotoxicity tests indicated the compounds of this invention have no appreciable pre- or post-emergence activity against plants.

Sulfides of this invention were tested in vivo for mildewcidal activity as follows: Each compound was formulated as an aqueous suspension at the desired concentration. Replicate bean (v. Bountiful) and in some cases cucumber (v. National Pickling) in at least the three-leaf stage were sprayed at 20 p.s.i. with these suspensions. The plants were dried and inoculated with aqueous suspensions of the pathogens as follows: Cucumber-powdery mildew: *Erysiphe cichoraceum*—35,000 spores per ml. Bean-powdery mildew: *Erysiphe polygoni*—25,000 spores per ml. The plants were allowed to incubate for 10 to 12 days. A percent control was then determined by comparing the disease on inoculated plants with standard plants. These results of these tests are reported in Table I.

TABLE I

| Compound | Conc., p.p.m. | Percent Control | |
|---|---|---|---|
| | | Bean (Bountiful) | Cucumber |
| 2-methoxy-1-naphthyl p-chlorophenyl sulfide | 500 | | |
| Do | 100 | 99 | 94 |
| 2-methoxy-4-nitro-1-naphthyl p-chlorophenyl sulfide | 500 | 85 | |
| 2-methoxy-1-dibromonaphthyl p-chlorophenyl sulfide | 500 | | |
| Do | 100 | 45 | |
| 2-hydroxy-1-naphthyl p-chlorophenyl sulfide | 500 | 90 | |
| Do | 100 | | 86 |
| 2,3-dihydroxy-1-naphthyl p-chlorophenyl sulfide | 500 | 35 | |
| 1-hydroxy-4-naphthyl p-chlorophenyl sulfide | 500 | 71 | |
| 1-methoxy-4-naphthyl p-chlorophenyl sulfide | 500 | 100 | |
| Do | 100 | | 89 |
| 2-ethoxy-1-naphthyl p-chlorophenyl sulfide | 500 | 96 | |
| 2-alloxy-1-naphthyl p-chlorophenyl sulfide | 500 | 83 | |
| 2-propargoxy-1-naphthyl p-chlorophenyl | 500 | 93 | |

Sulfides of this invention also showed activity against grape powdery mildew and rose powdery mildew.

As will be evident to those skilled in the art, various modifications on this invention can be made or followed, in the light of the foregoing disclosure and discussion, without departing from the spirit or scope of the disclosure or from the scope of the following claims.

What is claimed is:

1. Method for controlling mildew disease on a host subject to attack from said disease comprising applying a mildewcidally-effective amount of a compound of the formula

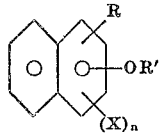

wherein R' is hydrogen or an aliphatic hydrocarbyl group containing 1 to 6 carbon atoms, the group defined as OR' is in the 1 or 2 position, X is hydroxyl, nitro or halogen of atomic number 17 to 35, $n$ is an integer from 0 to 2 and R is p-halophenylthio in which the halogen is of atomic number 17 to 35 and in the 1 position when OR' is in the 2 position and in the 4 position when OR' is in the 1 position, to said host.

2. The method of claim 1 wherein R is in the 1 position, the group defined by OR' is in the 2 position and $n$ is 0.

3. The method of claim 2 wherein the halogen of the p-halophenylthio is chlorine.

4. The method of claim 3 wherein R' is lower alkyl.

5. The method of claim 3 wherein R' is methyl.

6. The method of claim 1 wherein the host is a plant.

References Cited

Leandri et al.: Chem. Abs., 1955, vol. 49, pp. 15785–15786QD1A51. (Copy in P.O.S.L.)

ALBERT T. MEYERS, *Primary Examiner.*

D. R. MAHANAND, *Assistant Examiner.*